(12) United States Patent
Zamora et al.

(10) Patent No.: US 8,141,366 B2
(45) Date of Patent: Mar. 27, 2012

(54) GAS TURBINE ENGINE WITH VARIABLE AREA FAN NOZZLE

(75) Inventors: Sean P. Zamora, Coventry, CT (US); Michael Joseph Murphy, Vernon, CT (US)

(73) Assignee: United Technologies Corporation, Hartford, CT (US)

( * ) Notice: Subject to any disclaimer, the term of this patent is extended or adjusted under 35 U.S.C. 154(b) by 771 days.

(21) Appl. No.: 12/193,822

(22) Filed: Aug. 19, 2008

(65) Prior Publication Data
US 2010/0043393 A1    Feb. 25, 2010

(51) Int. Cl.
*F02K 1/00*    (2006.01)
(52) U.S. Cl. .................. 60/770; 60/226.1; 60/262
(58) Field of Classification Search .......... 60/231, 60/226.1, 262, 770, 771; 239/265.17, 265.19
See application file for complete search history.

(56) References Cited

U.S. PATENT DOCUMENTS

| | | |
|---|---|---|
| 3,161,018 A | 12/1964 | Sandre |
| 3,673,802 A | 7/1972 | Krebs et al. |
| 3,879,941 A | 4/1975 | Sargisson |
| 3,931,708 A | 1/1976 | Motycka |
| 4,043,121 A | 8/1977 | Thomas et al. |
| 4,068,471 A | 1/1978 | Simmons |
| 4,085,583 A | 4/1978 | Klees |
| 4,175,384 A | 11/1979 | Wagenknecht et al. |
| 4,409,788 A | 10/1983 | Nash et al. |
| 5,261,227 A | 11/1993 | Giffin, III |
| 5,388,964 A | 2/1995 | Ciokajlo et al. |
| 5,402,638 A | 4/1995 | Johnson |
| 5,404,713 A | 4/1995 | Johnson |
| 5,699,662 A * | 12/1997 | Born et al. ............. 60/770 |
| 5,778,659 A | 7/1998 | Duesler et al. |
| 5,794,432 A | 8/1998 | Dunbar et al. |
| 5,806,302 A | 9/1998 | Cariola et al. |
| 5,806,303 A | 9/1998 | Johnson |
| 5,809,772 A | 9/1998 | Giffin, III et al. |
| 5,867,980 A | 2/1999 | Bartos |
| 5,988,980 A | 11/1999 | Busbey et al. |
| 6,292,763 B1 | 9/2001 | Dunbar et al. |
| 6,318,070 B1 | 11/2001 | Rey et al. |
| 6,546,716 B2 | 4/2003 | Lair |
| 6,729,575 B2 | 5/2004 | Bevilaqua |
| 6,735,936 B2 | 5/2004 | Rey et al. |
| 6,901,739 B2 | 6/2005 | Christopherson |
| 7,004,047 B2 | 2/2006 | Rey et al. |
| 7,010,905 B2 * | 3/2006 | Lair ..................... 60/226.1 |
| 7,174,704 B2 | 2/2007 | Renggli |
| 2007/0186535 A1 * | 8/2007 | Powell et al. ............ 60/226.1 |

FOREIGN PATENT DOCUMENTS

EP    0567277 A1    10/1993

* cited by examiner

*Primary Examiner* — Ehud Gartenberg
*Assistant Examiner* — Nicholas Karnezos
(74) *Attorney, Agent, or Firm* — Carlson Gaskey & Olds PC

(57) ABSTRACT

A nozzle section of a gas turbine engine includes a regulator system in fluid communication with a secondary flow duct and a tertiary flow duct to selectively regulate communication of secondary airflow into the tertiary flow duct.

21 Claims, 7 Drawing Sheets

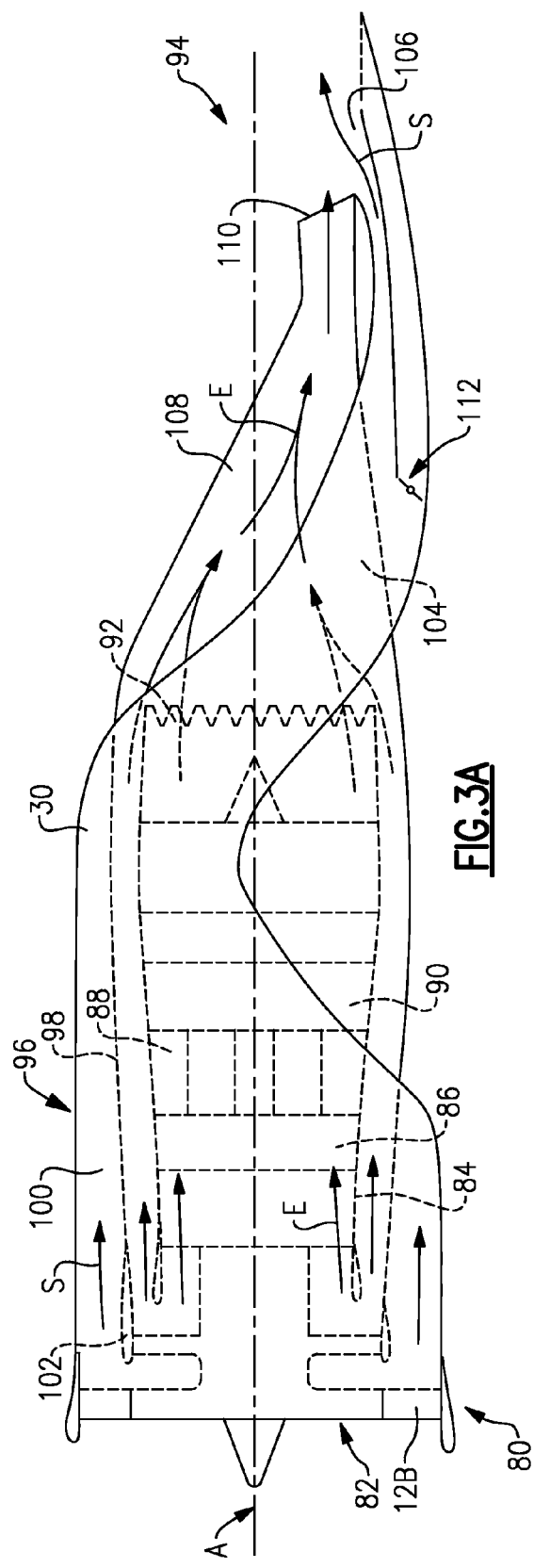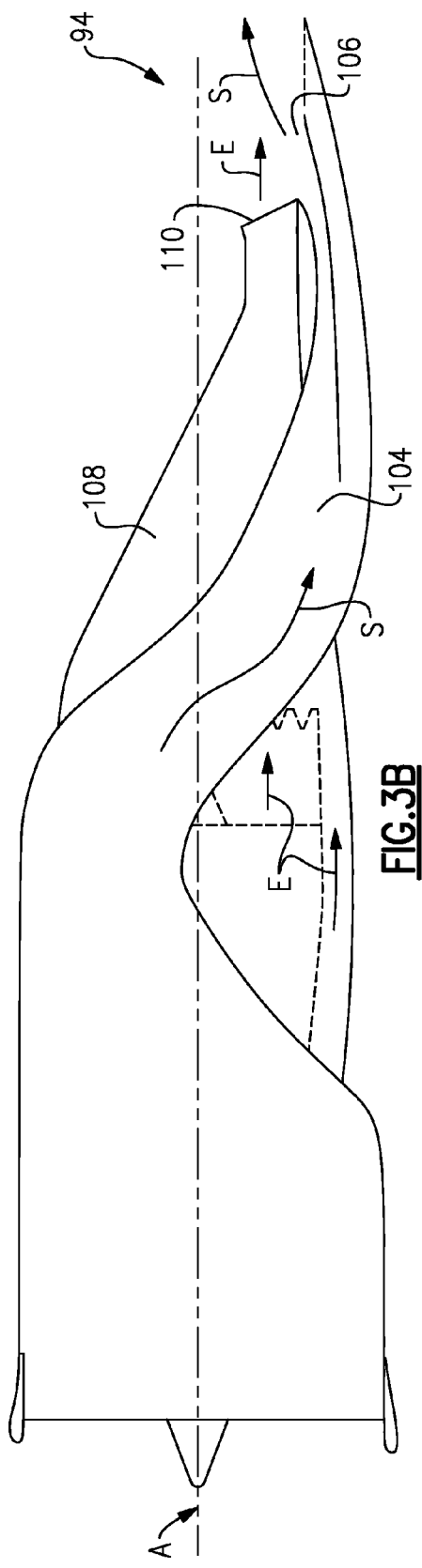

GAS TURBINE ENGINE WITH VARIABLE AREA FAN NOZZLE

BACKGROUND

The present invention relates to a gas turbine engine and more particularly to a nozzle system therefor.

Variable cycle engines power aircraft over a range of operating conditions yet achieve countervailing objectives such as high specific thrust and low fuel consumption. A variable cycle engine essentially alters the engine bypass ratio during flight to facilitate efficient performance over a broad range of altitude and flight velocity such as to generate high thrust for maneuver and optimized fuel efficiency for loiter.

Selective variance of a nozzle area of the engine bypass stream facilitates the overall engine performance over the range of operating conditions at various engine cycles.

SUMMARY

A nozzle section of a gas turbine engine according to an exemplary aspect of the present invention includes a regulator system in fluid communication with a secondary flow duct and a tertiary flow duct to selectively regulate communication of secondary airflow into the tertiary flow duct.

A gas turbine engine according to an exemplary aspect of the present invention includes a primary flow duct to communicate a primary airflow therethrough. A secondary flow duct to communicate a secondary airflow therethrough, the secondary flow duct defined at least partially around said primary flow duct. A regulator system in fluid communication with the secondary flow duct and a tertiary flow duct to selectively regulate communication of the secondary airflow into the tertiary flow duct.

A gas turbine engine according to an exemplary aspect of the present invention includes a primary flow duct that communicates a primary airflow from the core engine therethrough, the primary flow duct transitions into a generally planar primary nozzle. A secondary flow duct communicates a secondary airflow therethrough, the secondary flow duct defined at least partially around the primary flow path to transition into a generally planar secondary nozzle downstream of the primary nozzle. A regulator system is in fluid communication with the secondary flow duct and a tertiary flow duct to selectively regulate communication of the secondary airflow into the tertiary flow duct.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 3A is a general schematic partial phantom view of another exemplary gas turbine engine embodiment for use with the present invention;

FIG. 3B is a side view of a nozzle system;

DETAILED DESCRIPTION

Figure 1A:
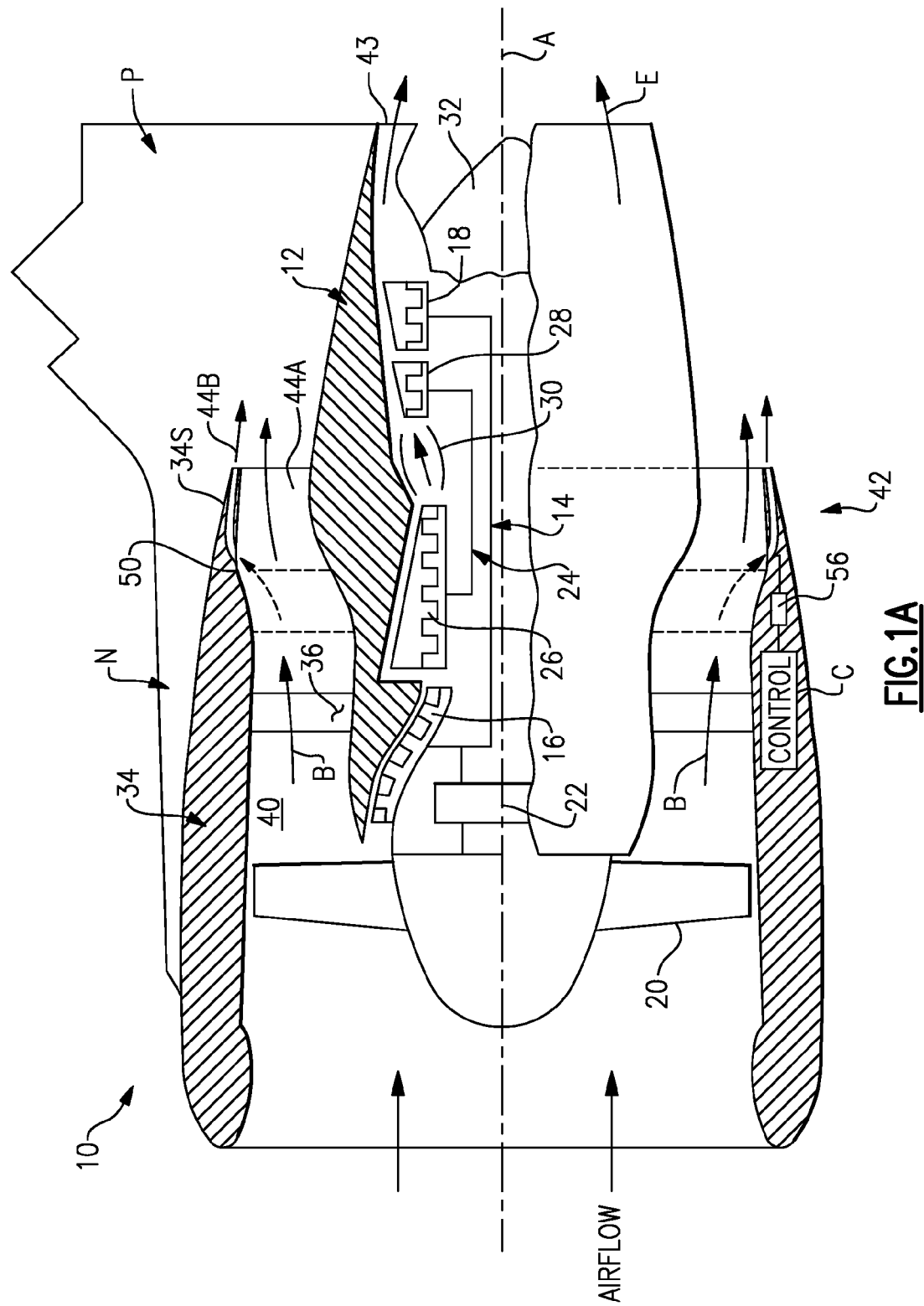
FIG. 1A is a general schematic partial fragmentary view of an exemplary gas turbine engine embodiment for use with the present invention.

FIG. 1A illustrates a general partial fragmentary schematic view of a gas turbofan engine 10 suspended from an engine pylon P within an engine nacelle assembly N as is typical of an aircraft designed for subsonic operation.

The turbofan engine 10 includes a core engine within a core nacelle 12 that houses a low spool 14 and high spool 24. The low spool 14 includes a low pressure compressor 16 and low pressure turbine 18. The low spool 14 also drives a fan section 20 through a gear train 22. The high spool 24 includes a high pressure compressor 26 and high pressure turbine 28. A combustor 30 is arranged between the high pressure compressor 26 and high pressure turbine 28. The low and high spools 14, 24 rotate about an engine axis of rotation A.

The engine 10 in one non-limiting embodiment is a high-bypass geared architecture aircraft engine with a bypass ratio greater than ten (10:1), a turbofan diameter significantly larger than that of the low pressure compressor 16, and the low pressure turbine 18 with a pressure ratio greater than 5:1. The gear train 22 may be an epicycle gear train such as a planetary gear system or other gear system with a gear reduction ratio of greater than 2.5:1. It should be understood, however, that the above parameters are only exemplary of one non-limiting embodiment of a geared architecture engine and that this disclosure is applicable to other gas turbine engines including direct drive turbofans.

Airflow enters a fan nacelle 34, which at least partially surrounds the core nacelle 12. The fan section 20 communicates airflow into the core nacelle 12 to power the low pressure compressor 16 and the high pressure compressor 26. Core airflow compressed by the low pressure compressor 16 and the high pressure compressor 26 is mixed with the fuel in the combustor 30 and expanded over the high pressure turbine 28 and low pressure turbine 18. The turbines 28, 18 are coupled for rotation with, respective, spools 24, 14 to rotationally drive the compressors 26, 16 and through the gear train 22, the fan section 20 in response to the expansion. A primary combustion core gas exhaust flow E exits the core nacelle 12 through a core nozzle 43 defined between the core nacelle 12 and a tail cone 32.

The core nacelle 12 is supported within the fan nacelle 34 by circumferentially space structures 36 often generically referred to as Fan Exit Guide Vanes (FEGVs). A secondary airflow or bypass flow path 40 is defined between the core nacelle 12 and the fan nacelle 34. The engine 10 generates a high bypass flow arrangement with a bypass ratio in which approximately eighty percent of the airflow which enters the fan nacelle 34 becomes bypass flow B. The bypass flow B communicates through the generally annular bypass flow path 40 and is discharged from the engine 10 through a variable area fan nozzle (VAFN) 42 which defines a primary bypass nozzle exit area 44A between the fan nacelle 34 and the core nacelle 12 at a fan nacelle end segment 34S of the fan nacelle 34 downstream of the fan section 20. A secondary bypass nozzle exit area 44B is defined by the fan nacelle end segment 34S.

Thrust is a function of density, velocity, and area. One or more of these parameters can be manipulated to vary the amount and direction of thrust provided by the bypass flow B. The VAFN 42 operates to effectively vary the area of the fan primary bypass nozzle exit area 44A to selectively adjust the pressure ratio of the bypass flow B in response to a controller C. Low pressure ratio turbofans are desirable for their high propulsive efficiency. However, low pressure ratio fans may be inherently susceptible to fan stability/flutter problems at low power and low flight speeds. The VAFN allows the engine to change to a more favorable fan operating line at low power, avoiding the instability region, and still provide the relatively smaller nozzle area necessary to obtain a high-efficiency fan operating line at cruise.

A significant amount of thrust is provided by the bypass flow B due to the high bypass ratio. The fan section 20 of the engine 10 is preferably designed for a particular flight condition—typically cruise at 0.8M and 35,000 feet. As the fan blades within the fan section 20 are efficiently designed at a particular fixed stagger angle for an efficient cruise condition, the VAFN 42 is operated to effectively vary the fan primary bypass nozzle exit area 44A to adjust fan bypass air flow such that the angle of attack or incidence on the fan blades is maintained close to the design incidence for efficient engine operation at other flight conditions, such as landing and takeoff to thus provide optimized engine operation over a range of flight conditions with respect to performance and other operational parameters such as noise levels.

The VAFN 42 generally includes a regulator system 50 (FIG. 1B) having a first section 52 and a second section 54 movably mounted relative the first section 52. The second section 54 slides about the engine axis A relative the first section 52 to change the effective area of the secondary bypass nozzle exit area 44B. The second section 54, in one non-limiting embodiment, slides in response to an actuator 58 (illustrated schematically) to communicate at least a portion of the bypass flow B' into the fan nacelle 34 and through the secondary bypass nozzle exit area 44B.

The VAFN 42 changes the physical area and geometry of the bypass flow path 40 during particular flight conditions. The bypass flow B is effectively altered by movement of the second section 54 relative the first section 52 between a closed position (FIG. 2A) and an open position (FIG. 1D) with a multitude of positions therebetween (FIG. 1E). It should be understood that an essentially infinite change in the bypass flow exit area may be provided by the regulator system 50.

Figure 1B:
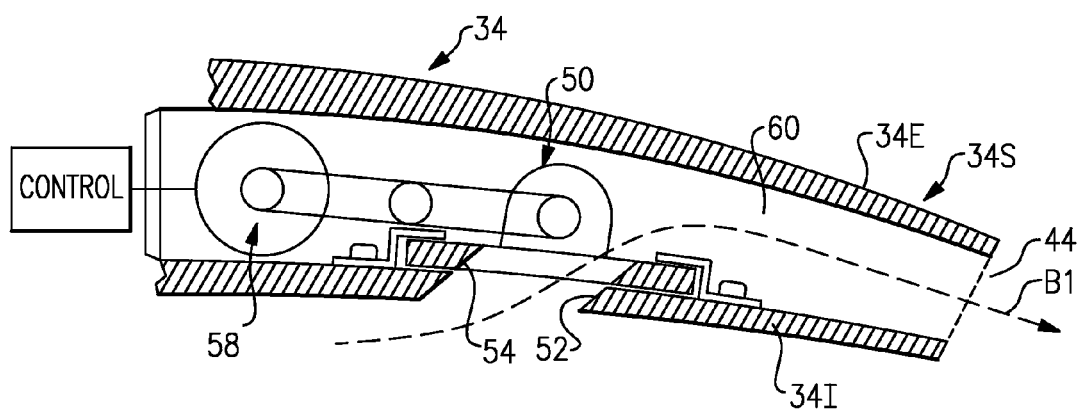
FIG. 1B is a sectional side view of a regulator system of FIG. 1A in an open position.
Figure 1C:
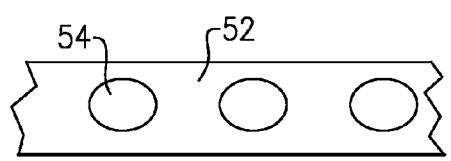
FIG. 1C is a face view of the regulator system in an closed position.
Figure 1D:
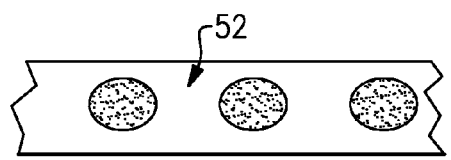
FIG. 1D is a face view of the regulator system in an open position.
Figure 1E:
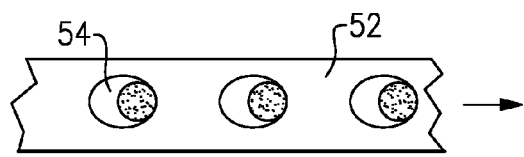
FIG. 1E is a face view of the regulator system in an intermediate position.

Referring to FIG. 1B, the VAFN 42 is opened by moving the second section 54 relative the first section 52 to open a tertiary flow path 60 in fluid communication with the fan nacelle end segment 34S to increase the bypass flow exit area. That is, the bypass flow exit area with the tertiary flow path 60 in an open position (FIG. 1D) is greater than bypass flow exit area with the tertiary flow path 60 in a closed position (FIG. 1C). In one non-limiting embodiment, the tertiary flow path 60 is incorporated within the fan nacelle 34 aft of the Fan Exit Guide Vanes 36 (FEGVs). The tertiary flow path 60 communicates bypass airflow from a fan nacelle inner wall 34I to the fan nacelle end segment 34S defined between the fan nacelle inner wall 34I and the fan nacelle outer wall 34E.

In operation, the regulator system 50 communicates with the controller C to move the second section 54 relative the first section 52 to selectively communicate bypass airflow into the tertiary flow path 60. Various control systems including an engine controller or an aircraft flight control system may alternatively or additionally be utilized.

By adjusting the regulator system 50, engine thrust and fuel economy are maximized during each flight regime. The additional bypass flow which is exhausted from the fan nacelle end segment 34S may at least partially fill the trailing edge wake to increase overall engine thrust.

Figure 2A:
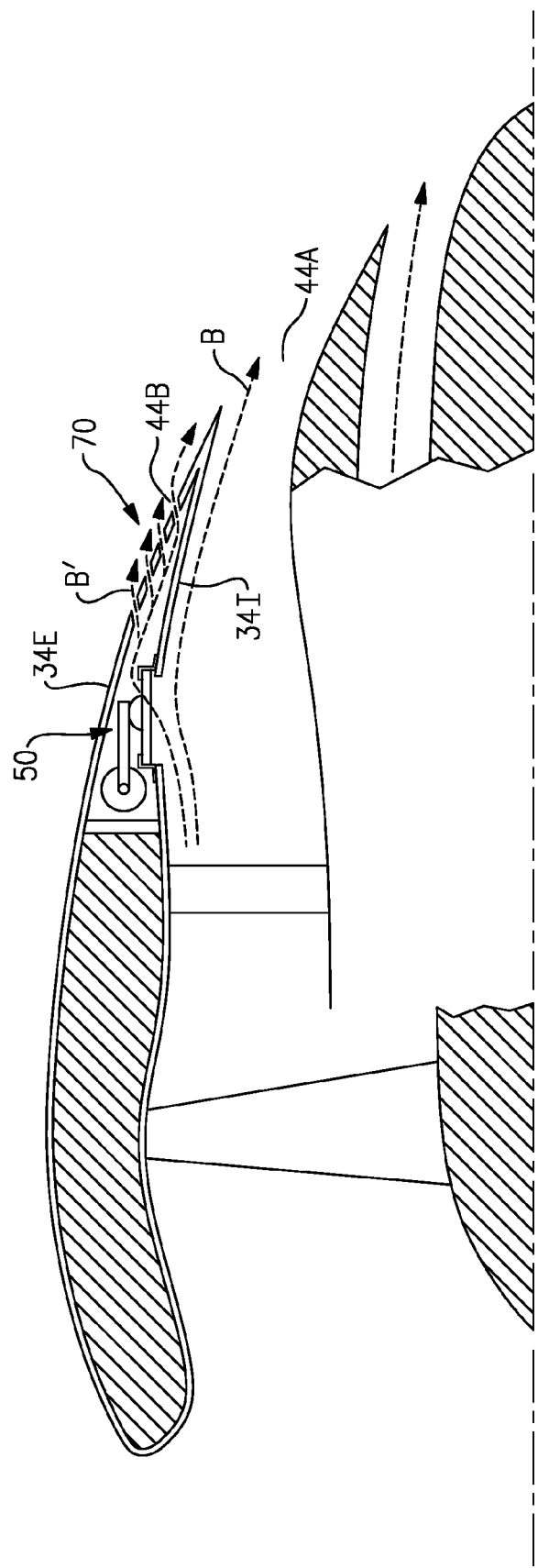
FIG. 2A is a general schematic partial fragmentary view of another exemplary gas turbine engine embodiment for use with the present invention.
Figure 2B:
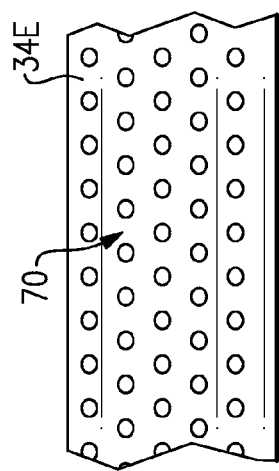
FIG. 2B is a face view of an ejector region through a fan nacelle.
Figure 2C:
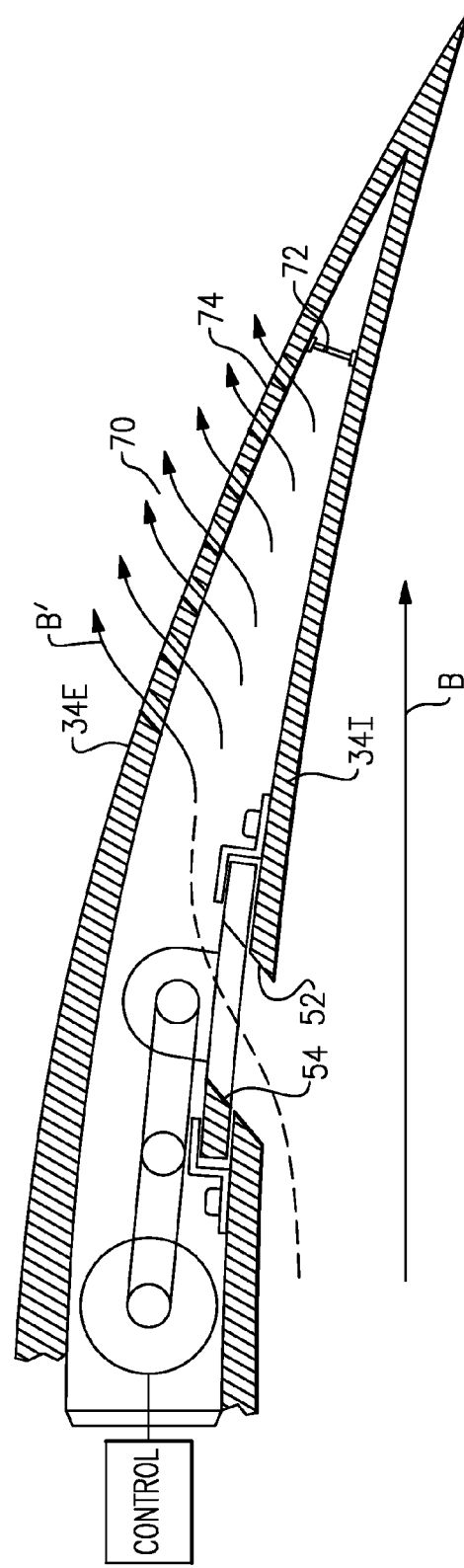
FIG. 2C is a sectional side view of a regulator system of FIG. 2A in an open position.

Referring to FIG. 2A, another non-limiting embodiment includes an ejection region 70 defined through fan nacelle outer wall 34E (FIG. 2B). That is, the tertiary flow path 60 communicates bypass airflow from a fan nacelle inner wall 34I to the through the ejection region 70 defined in the fan nacelle outer wall 34A. The ejection region 70 may include a perforated outer face sheet 72 supported by a structure 74 of the fan nacelle 34 (FIG. 2C). It should be understood that the ejection region 70 is illustrated in partial schematic cross-section and that various arrangements may be provided to support the perforated outer face sheet 68.

In operation, the regulator system 50 communicates with the controller C to move the second section 54 relative the first section 52 to selectively communicate bypass airflow into the tertiary flow path 60. The bypass airflow flows into the fan nacelle 34 through the regulator system 50 and exit through the ejection region 70 to vary the bypass flow exit area such that the bypass flow exit area with the tertiary flow path 60 in an open position is greater than exit area with the tertiary flow path 60 in a closed position. It should be understood that an essentially infinite change in the bypass flow exit area may be provided by the regulator system 50.

By adjusting the regulator system 50, engine thrust and fuel economy are maximized during each flight regime. Furthermore, should flow separation exist over the fan nacelle 34, the additional flow from the ejection region 70 over the fan nacelle outer wall 34E energizes the boundary layer and thereby reduces drag.

Referring to FIG. 3A, another non-limiting embodiment utilizes the additional flow to provide a source of low temperature cooling air to cool nozzle external surfaces. A gas turbine engine 80 of a relatively low bypass configuration, generally includes at least a fan section 82, a low pressure compressor section 84, a high pressure compressor section 86, a combustor section 88, a turbine section 90, an augmentor section 92, and a nozzle section 94. The low pressure compressor section 84, high pressure compressor section 86, combustor section 88, and turbine section 90 are generally referred to as the core engine. An axis of the engine A extends longitudinally through these sections. It should be understood that the engine 80 may include alternative and additional sections.

An engine duct structure 96 and an inner structure 98 define an at least partially annular secondary flow path 100 at least partially around a perimeter of a primary flow path 102 which directs a primary combustion core gas exhaust flow (illustrated schematically by arrow E). It should be understood that the engine duct structure 96 may also at least partially define various airflow paths other than the disclosed secondary flow path 100.

The secondary flow path 100 guides a secondary airflow S between the engine duct structure 96 and the inner structure 98. The secondary airflow S is typically sourced from the fan section and/or compressor section to provide a bypass flow. The secondary airflow S is utilized for a multiple of purposes including, for example, cooling, pressurization, and mixing with the core gas exhaust flow E prior to discharge through the nozzle section 94 during particular operational profiles. The secondary airflow S as defined herein is any airflow different from the primary combustion core gas exhaust flow E which may be provided as variable cycle third stream fan flow deployed, for example, by operating a set of outboard fan blades 12B located in the secondary flow path 100 which surrounds the core engine.

Figure 3C:
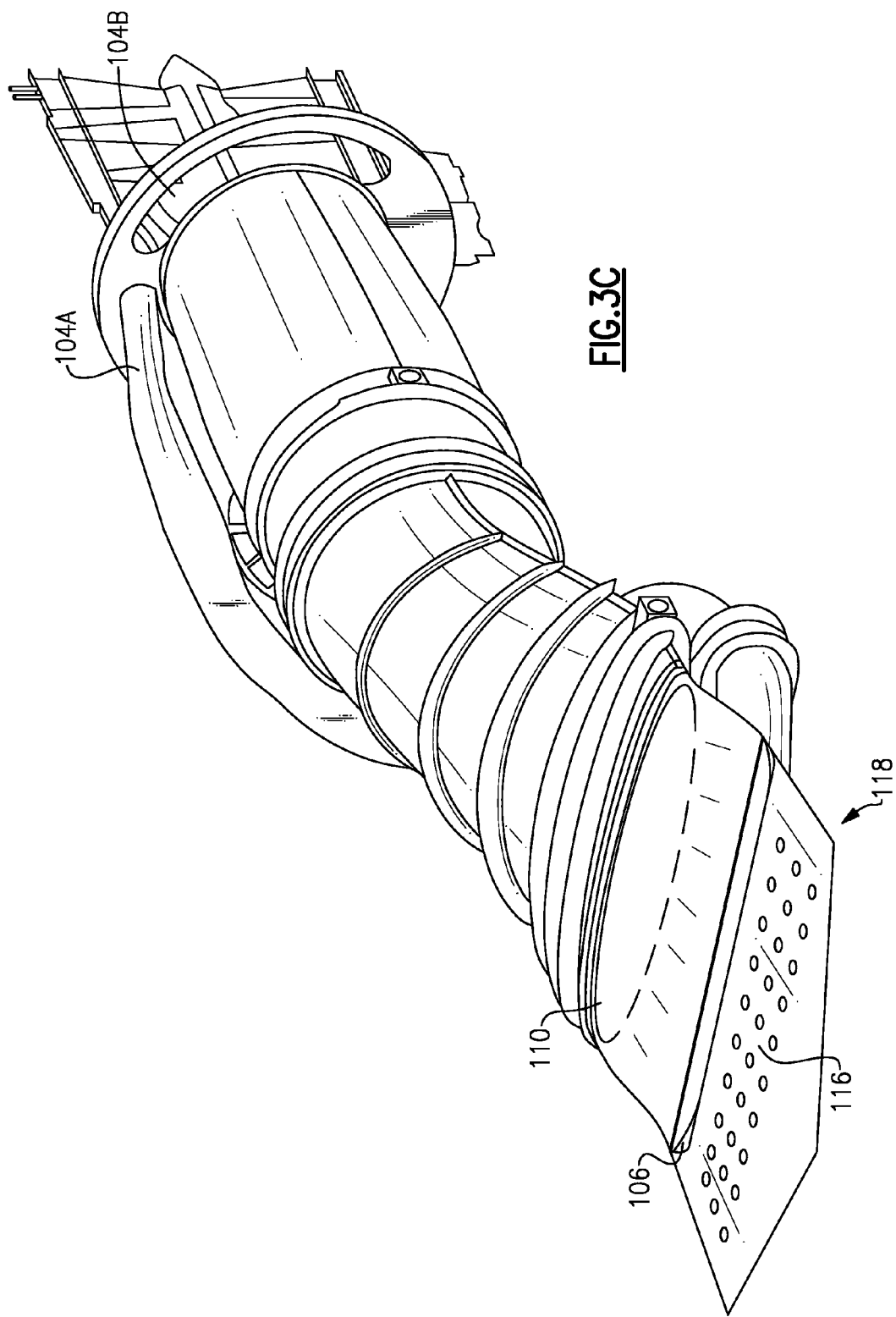
FIG. 3C is a perspective rear view of the nozzle system.

The nozzle section 94 generally includes a secondary flow duct 104 with a generally planar secondary nozzle 106 and a primary duct 108 with a generally planar primary nozzle 110 (FIG. 3B). The secondary flow duct 104 communicates secondary airflow S therethrough and the primary duct 108 communicates primary combustion core gas exhaust flow E therethrough. The secondary flow duct 104 in one non-limiting embodiment is a bifurcated duct arrangement having a first duct 104A and a second duct 104B (not shown) which join at the secondary nozzle 32 (FIG. 3C). The primary duct 108 is generally circular in cross-section at an upstream segment and transitions into the planar primary nozzle 110 at an aft end segment (FIG. 3B). The secondary nozzle 106 and the primary nozzle 110 in the disclosed non-limiting embodiment include a chevron-shaped trailing edge, however, it should be understood that any other configuration may alternatively be utilized.

Figure 3D:
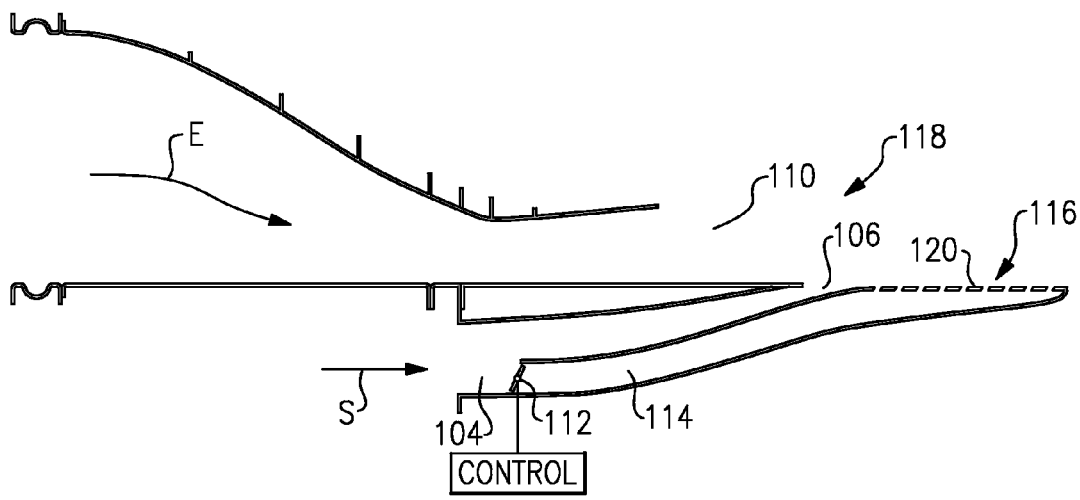
FIG. 3D is an expanded view of a regulator system in a closed position.

Referring to FIG. 3D, a regulator system 112 is located within the secondary flow duct 104 to selectively communicate secondary airflow S downstream of the primary nozzle 110. The secondary flow duct 104 includes a secondary bypass flow duct 114 which communicates with an ejection region 116 downstream of the secondary nozzle 106 through an aft deck structure 118. The ejection region 116 may include a perforated outer face sheet 120 of the aft deck structure 118 to control the mixture or injection of secondary airflow S to cool the aft deck structure 118. It should be understood that the ejection region 116 is illustrated in partial schematic cross-section and that various arrangements may be provided. The ejection region 116 may alternatively or additionally include a mesh, grid, metering hole, honeycomb or other shaping structure to directs and smooth the airflow therethrough as well as reduces noise generation.

Figure 3E:
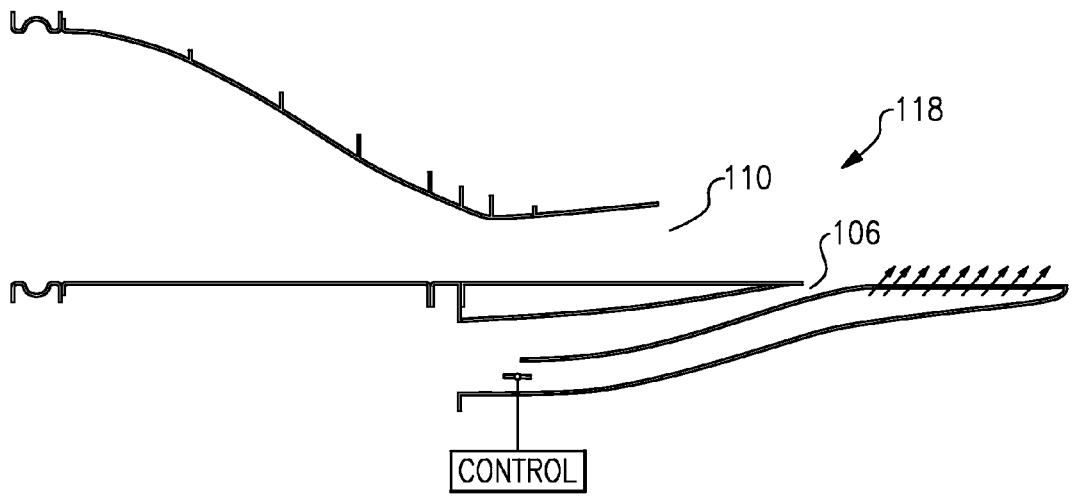
FIG. 3E is an expanded view of a regulator system in an open position.

The regulator system 112 controls secondary airflow S into the bypass flow duct 114. In one non-limiting embodiment, the secondary nozzle 106 is sized for minimum secondary airflow S requirements when the regulator system 38 is in a closed position. When the regulator system 38 is in an open position (FIG. 3E), the total nozzle area of the secondary nozzle 106 and the ejection region 120 provides for maximum secondary airflow S requirements. That is, the secondary flow exit area with the regulator system 112 in an open position is greater than secondary flow exit area with the regulator system 112 in a closed position. It should be understood that essentially infinite intermediate positions are available.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed:

1. A nozzle section of a gas turbine engine comprising:
   a primary flow duct to communicate a primary airflow therethrough, said primary flow duct transitions into a primary nozzle;
   a secondary flow duct to communicate a secondary airflow therethrough, said secondary flow duct defined at least partially around said primary flow duct and transitions into a secondary nozzle aft of said primary nozzle;
   a tertiary flow duct that communicates through an ejection region in an aft deck structure axially aft of said secondary nozzle; and
   a regulator system in fluid communication with said secondary flow duct and said tertiary flow duct to selectively regulate communication of said secondary airflow into said tertiary flow duct.

2. The nozzle section as recited in claim 1, further comprising a fan nacelle mounted at least partially around a core nacelle to define said secondary flow duct.

3. The nozzle section as recited in claim 2, said tertiary flow duct defined from an inner wall of said fan nacelle to a fan nacelle end segment.

4. The nozzle section as recited in claim 3, said regulator system located within said fan nacelle.

5. The nozzle section as recited in claim 2, said tertiary flow duct defined from an inner wall of said fan nacelle to an outer wall of said fan nacelle.

6. The nozzle section as recited in claim 5, further comprising an ejection region defined through said outer wall.

7. The nozzle section as recited in claim 6, said ejection region includes a perforated outer face sheet.

8. The nozzle section as recited in claim 5, said regulator system located within said fan nacelle.

9. The nozzle section as recited in claim 1, said primary flow duct is generally circular in cross-section at an upstream segment and transitions into said primary nozzle at a downstream segment.

10. The nozzle section as recited in claim 1, said secondary flow duct is bifurcated.

11. The nozzle section as recited in claim 10, said bifurcated secondary duct joins at said secondary nozzle.

12. The nozzle section as recited in claim 1, said secondary nozzle communicates through said aft deck structure.

13. The nozzle section as recited in claim 1, said ejection region includes a perforated outer face sheet.

14. A gas turbine engine comprising:
    a core engine defined about an axis;
    a fan driven by said core engine about said axis;
    a primary flow duct to communicate a primary airflow from said core engine therethrough, said primary flow duct is generally circular in cross-section at an upstream segment and transitions into a planar primary nozzle at a downstream segment;
    a secondary flow duct to communicate a secondary airflow from said fan therethrough, said secondary flow duct defined at least partially around said primary flow duct and transitions into a secondary nozzle aft of said planar primary nozzle;
    a tertiary flow duct that communicates through an ejection region in an aft deck structure axially aft of said secondary nozzle; and
    a regulator system in fluid communication with said secondary flow duct and said tertiary flow duct to selectively regulate communication of said secondary airflow into said tertiary flow duct.

15. The gas turbine engine as recited in claim 14, said tertiary flow duct defined within a fan nacelle through a fan nacelle inner wall to a fan nacelle end segment defined between said fan nacelle inner wall and a fan nacelle outer wall.

16. The gas turbine engine as recited in claim 14, said tertiary flow duct defined within a fan nacelle through a fan nacelle inner wall to said ejection region within a fan nacelle outer wall, said ejection region includes a perforated outer face sheet.

17. A gas turbine engine comprising:
a core engine defined about an axis;
a fan driven by said core engine about said axis;
a primary flow duct to communicate a primary airflow from said core therethrough, said primary flow duct generally circular in cross-section at an upstream segment to transition into a generally planar primary nozzle at a downstream segment;
a secondary flow duct to communicate a secondary airflow therethrough, said secondary flow duct defined at least partially around said primary flow duct to transition into a generally planar secondary nozzle downstream of said primary nozzle;
a tertiary flow duct that communicates through an ejection region in an aft deck structure axially aft of said secondary nozzle; and
a regulator system in fluid communication with said secondary flow duct and said tertiary flow duct to selectively regulate communication of said secondary airflow into said tertiary flow duct.

18. The nozzle section as recited in claim 1, said secondary nozzle is planar.

19. The nozzle section as recited in claim 1, said secondary nozzle is two-dimensional.

20. The nozzle section as recited in claim 1, said primary nozzle is planar.

21. The nozzle section as recited in claim 1, said primary nozzle is two-dimensional.

\* \* \* \* \*